United States Patent Office 3,144,473
Patented Aug. 11, 1964

3,144,473
METHOD FOR PREPARING ZINC DIALKYLS SUITABLE FOR USE IN POLYMERIZATION CATALYSTS
John Boor, Jr., Richmond, Oliver Johnson, Berkeley, and Kenzie Nozaki, El Cerrito, Calif., assignors to Shell Oil Company, a corporation of Delaware
No Drawing. Filed Aug. 17, 1959, Ser. No. 833,951
3 Claims. (Cl. 260—429.9)

This invention relates to an improved catalyst for polymerization of unsaturated hydrocarbons. More particularly, it relates to a method for preparing zinc dialkyl suitable for use in catalysts for the polymerization of alpha-monoolefins.

It is known that alpha-monoolefins can be polymerized at low temperatures and low pressures to produce polymers which are linear in structure. The methods for carrying out such polymerizations are generically referred to as "low pressure" methods and the polymers thus produced are termed "crystalline," "low pressure," "linear" or "isotactic" polymers. Low pressure polymers are produced by employing any of a variety of catalysts which are called "low pressure" or "Ziegler type" catalysts. This use of catalysts of this type for the polymerization of diolefins has also been suggested.

A particularly useful linear polymer of the low pressure type is polypropylene. Isotactic polypropylene is highly useful because it has improved physical properties such as higher tensile strength, higher melting point and the like as compared to amorphous polypropylene. In the commercial production of isotactic polypropylene it is particularly desirable to produce a polymer in which the proportion of isotactic material is very high, i.e., 90 to 95% or higher. It is generally found that when material of such high crystallinity is produced the molecular weight of the resulting polymer also increases to an undesirably high value.

The measurement generally employed as an indication of molecular weight of these polymers is the "intrinsic viscosity" (I.V.) expressed in deciliters per gram (dl./g.). The intrinsic viscosity of polypropylene produced by known catalyst systems is usually in the range of 4 to 20 dl./g., determined in decalin at 150° C. For many uses, e.g., for the production of molded products of propylene, it is desirable to have I.V. values in the range of 2 to 4 dl./g.

The present invention is concerned with an improvement in the low pressure polymerization of alpha-monoolefins which permits the production of polyolefins of desirably low I.V. and particularly of stereospecific polyolefins of relatively low I.V.

It is an object of this invention to provide improved low pressure polymerization catalysts. A further object is to provide a method for preparing a catalyst containing zinc dialkyl which is suitable for practical employment in the polymerization of ethylenically unsaturated compounds. A specific object is to provide an improved catalyst for the polymerization of propylene and higher alpha-monoolefins to produce polymers of relatively high stereospecificity and low I.V. Other objects will become apparent as the description of the invention proceeds.

These and other objects are accomplished in the process for the polymerization of ethylenically unsaturated compounds with a catalyst formed by mixing a strong reducing agent with a compound selected from the group consisting of compounds of transition metals selected from Groups IVa, Va, VIa and VIII of the Mendeléeff's Periodic Table and manganese by the improvement comprising conducting the polymerization in the presence of a zinc dialkyl which has been specially prepared in a manner to be described hereafter and which is present as said reducing agent or as an adjunct of said reducing agent. In accordance with this invention crude zinc dialkyl is contacted with a reducing metal selected from Groups I, II and III of the Periodic Table, preferably metallic sodium or barium, and is recovered from said contact in a purified form, suitable for use in the above described catalytic systems.

To avoid awkward nomenclature, this text will follow the practice of others in this field and refer to all zinc dihydrocarbyl compounds as zinc dialkyls. This term includes, therefore, zinc diaryls. An example of this usage is found in "The Chemistry of Organometallic Compounds," by E. G. Rochow et al., John Wiley and Sons, 1957, pp. 100–105; Table 5 of the reference, at page 102, listing physical characteristics of zinc alkyls and zinc aryls, includes both under the generic term "zinc alkyls."

Reactants, catalysts and conditions useful in the polymerization process of this invention are known to the prior art on the production of linear polymers of alpha-monoolefins. They are described, for example, in Belgium Patents Nos. 534,792 and 538,782 to Ziegler and Ziegler et al., respectively. In general, the catalyst comprise the reaction product of (1) a compound of a transition metal selected from manganese and the metals in subgroups "a" of Groups IV, V and VI and in Group VIII of the Mendeléeff's Periodic Table as illustrated on page 28 of Ephraim, "Inorganic Chemistry," Sixth English edition, with (2) a strong reducing compound which may be, for example, a compound of the formula $R_1R_2AlX$ or $R_1AlX_2$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan, thiophenol, carboxylic acid and sulfonic acid, or a compound selected from the group consisting of zinc alkyl, aluminum trialkyl, magnesium alkyl and Grignard compound.

Most frequently employed Ziegler type catalysts are those selected from the reaction product of a Group IVa metal halide such as zirconium trichloride, titanium trichloride and the like and an aluminum dialkyl halide or aluminum trialkyl or mixtures thereof, with the last being more preferred. Representative aluminum alkyls include, for example, aluminum diethyl chloride, aluminum diethyl bromide, aluminum triethyl aluminum triisobutyl, aluminum triisopropyl and others wherein the alkyl radicals have from 1 to 10 carbon atoms. In general, low pressure catalysts are said to include the reaction product of a compound of a Group IV to VI or VIII transition metal and a strong reducing agent.

Although many catalyst compositions have been suggested and may be employed to produce low pressure polymer, in practice it is found that many of these compositions produce only small amounts of polymer under practical conditions or produce polymers which are undesirable for most purposes by reason of having, for example, excessively high molecular weight or excessive amounts of very low molecular weight material or having an undesirably low degree of crystallinity and the like. Only few catalysts systems actually are adapted to produce on a commercial scale polymers having the required degree of stereospecificity, I.V., melt index, yield point and other properties.

Although it has been generally recognized in the art that zinc alkyls should be suitable reducing agents for use with compounds of transition metals of Groups IV to VI it is only in a few rare instances that working examples of the use of zinc alkyls are shown in any of the patents and literature articles dealing with this subject, as contrasted with hundreds of examples showing the use of aluminum alkyls. Such examples as exist generally deal with the production of polyethylene, which does not present the problems encountered in the production of isotactic polypropylene or higher isotactic polyolefins.

It has now been found that polymerization methods utilizing catalyst in which zinc dialkyl is the sole reducing agent are extremely sensitive to trace impurities present in the zinc dialkyl and that very erratic results are produced when using techincally pure zinc dialkyl, but that much improved, consistent results are obtained by first purifying the zinc dialkyl in accordance with this invention. The same purification technique is also very useful in processes employing catalysts in which zinc dialkyl is not the sole reducing agent but is added to modify the properties of another as described, for example, in copending application Serial No. 833,950, filed August 17, 1959.

Zinc alkyls of technical grade which are further purified in accordance with this invention are highly purified compounds containing only very small amounts of impurities. These zinc alkyls are usually produced by the reaction:

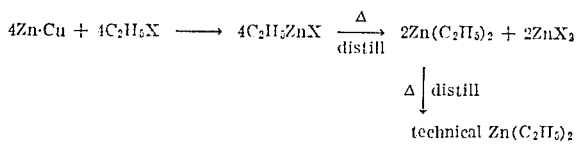

where X stands for Br or I.

When zinc alkyls prepared in this manner and not purified in accordance with this invention were employed together with titanium trichloride for the polymerization of propylene it was found that successive experimental runs were characterized by long and varying induction periods ranging from 1 to 8 hours, by low polymerization rates and by the production of polypropylene having a relatively low crystallinity, e.g., not above 60% insoluble in boiling heptane.

Various techniques for purifying the technical grade zinc alkyls were attempted including fractional distillation through a spinning band column, treatment with small amounts of LiAlH$_4$, hydrazine and AlEt$_3$ but these were not found effective under the conditions which were used.

In an attempt to prepare a mixed alkyl compound of zinc and barium it was discovered that a mixture of solids and liquids prepared by heating metallic barium with liquid zinc diethyl under refluxing conditions was an improved catalyst for polymerization of propylene when combined with titanium trichloride. It was then found that the solid portion of the mixture, which contained barium, was an ineffective catalyst whereas the liquid portion consisting only of zinc diethyl was a much improved catalyst compared to untreated zinc diethyl. Thus, it was concluded that the treatment under refluxing conditions with barium had removed some unidentified impurity present in the technical grade of zinc diethyl and had resulted in the production of purified zinc diethyl. It was found that zinc diethyl can be similarly purified by heating under reflux conditions in the presence of metallic sodium and then distilling off the zinc diethyl. The zinc dialkyl may be dissolved in a solvent such as heptane prior to contact with the metal. Other satisfactory methods of producing purified zinc dialkyls are by contacting the liquid zinc dialkyl or a solution of it in an appropriate solvent such as heptane with a reducing metal from Groups I, II or III of the Periodic Table, e.g., sodium, potassium, lithium, barium, calcium, strontium, or aluminum. Those from Groups I and II are preferred. Preferably the zinc dialkyl is subsequently removed from the solid residue, e.g., by decanting, fractionation or flash distillation, but it may also be employed in the presence of the solid residue, if desired.

It is well known that alkali metals and alkaline earth metals react with zinc alkyl to form complex compounds (see J. A. Wanklyn, Ann., 108, 67 (1858), cited in "The Chemistry of Organo Metallic Compounds" supra, page 104). The alkali metals or alkaline earth metals are suitably contacted with zinc alkyls in a small amount, such as 5 mol percent based on zinc alkyl as illustrated in Example 3.

No certain explanation of the action of the reducing metal can be offered. It is suspected that the effect may be at least in part due to the removal of alkyl halides. An analysis of technical zinc diethyl prior to purification found the alkyl halide content thereof to be quite low, namely, about 0.002 milliequivalent of halogen per gram of solution. Analysis of a sample purified according to this invention showed that the halogen content had been reduced still further, to less than 0.001 milliequivalent halogen per gram of solution.

The conditions under which the purifying treatment takes place may include temperatures from atmospheric temperature up to the reflux temperature of the particular zinc dialkyl or solution of it being treated and treating times may range from a few minutes up to several hours.

The low pressure polymerizations of alpha-monoolefins, e.g., of ethylene, propylene, butene-1, mixtures thereof and the like are carried out at temperatures ranging from 0° C. to about 120° C. with temperatures in the order of about 20 to 80° C. being particularly useful. Suitable pressures range from about atmospheric pressure up to several atmospheres, with pressures in excess of 500 p.s.i. rarely being employed. The catalysts may be simply prepared by mixing the various components to form the active catalysts. Preferably the catalyst components are mixed as solutions in inert diluents such as heptane, isooctane, benzene or the like, and the process itself is also preferably conducted in the presence of such inert diluents. The diluents as well as the catalyst components and reactants are preferably pre-treated to remove harmful impurities such as sulfur, oxygen, moisture, oxygen-containing compounds and the like and the polymerization is preferably conducted under conditions that exclude atmospheric impurities such as moisture, oxygen and the like. After the polymerization is complete the polymer is recovered by any of several conventional means, the most common of which includes destroying the catalyst with a compound that reacts with and inactivates the catalyst. Such compounds include, for example, low alcohols such as methanol, ketones such as acetone and the like. Thereafter, the polymer is separated from the diluent and is washed a few times and dried. The polymer produced by the present invention may be treated by any conventional means to remove or reduce the catalyst residues which remain in the polymer at the termination of the polymerization.

The invention described herein is particularly important as it relates to the low pressure polymerization of propylene and higher alpha-monoolefins to produce polymers of high stereospecificity. In general, straight chain and branched aliphatic terminally unsaturated olefins having from 3 to 20 carbon atoms per molecule and preferably from 3 to 12 carbon atoms per molecule are the most suitable feeds. This includes 1-butene, 1-pentene, 3-methyl-1-pentene, 1-decene and the like. The present improvements may, however, also be utilized in the polymerization of ethylene or mixtures of ethylene and propylene and other ethylenically unsaturated compounds as well as those diolefins which can be polymerized by low pressure catalysts. The numerous teachings of the prior art with respect to Ziegler type polymerization techniques, proportions of catalytic components and the like are applicable in the process of this invention.

Suitable zinc compounds for use in this invention are those having from 1 to 10 carbon atoms in each hydrocarbyl group. Usually the two hydrocarbyl groups are identical but they may be different, if desired. Zinc diethyl and zinc di-n-propyl are particularly preferred compounds. Other zinc alkyls which can be used in this invention are zinc diisopropyl, zinc diisobutyl, zinc diisoamyl, zinc diphenyl, zinc ditolyl and the like.

The transition metal compounds which are most particularly adapted for use with a strong reducing agent including at least some zinc dialkyl prepared in accordance with this invention are various forms of titanium trichloride. One form is the commercially available trichloride, which is usually a compound of purple color. In another suitable form, a titanium trichloride may be prepared, for example, by reacting a hydrocarbon solution of aluminum triethyl and titanium tetrachloride in a mol ratio ranging from about 0.1:1 to less than 0.4:1 at elevated temperatures until the aluminum triethyl is completely oxidized. Thereafter the total product of the first step may be reacted with a hydrocarbon solution of a suitable aluminum alkyl compound, e.g., aluminum diethyl chloride or aluminum triethyl to give a total aluminum to titanium mol ratio of at least 1:1. The resulting product is a suspension of a catalyst, usually of brown or black color, in a hydrocarbon solution. The solid catalyst may be recovered and purified by decanting or filtration and evaporation of remaining liquid constituents.

Titanium trichloride, regardless of its method of preparation, may be used with a strong reducing agent which may consist of zinc diethyl or of an aluminum alkyl containing some zinc diethyl, as has been described above. If an aluminum alkyl is to be present, the titanium compound need not be recovered as a solid but may be used in suspension. The preparation of a titanium halide catalyst in which titanium tetrachloride is first reacted with the above-defined amount of aluminum triethyl and subsequently with the above-defined amount of aluminum diethyl chloride is described in greater detail in copending patent application Serial No. 793,250, filed February 16, 1959, now U.S. Patent 2,971,925.

The purification process of this invention makes practical the use of zinc dialkyl as sole reducing compound in the preparation of a low pressure catalyst. A preferred method for preparing a low pressure catalyst, therefore, consists of forming titanium trichloride by reacting titanium tetrachloride with from 0.1 to 0.4 mol aluminum triethyl per mol titanium tetrachloride at elevated temperatures, removing the resulting solid from reaction mixture as by decanting or filtering and placing the solid residue under vacuum, e.g., at temperatures of from 25° to 200° C. and preferably about 85° C. and pressures down to less than 1 mm. to remove remaining volatile components. This solid can then be used, similarly to the commonly available titanium trichloride, in admixture with zinc dialkyl purified in accordance with this invention.

This invention will be further illustrated by means of the following examples which, however, are only for the purpose of explanation and are not to be considered a limitation of the invention.

In these examples the crystallinity of polypropylene produced was determined by measuring the percent of the product which was insoluble in boiling heptane. The higher this value, the more crystalline the polymer.

EXAMPLE 1

In a series of runs propylene was polymerized in hydrocarbon solution by contact with a catalyst consisting of titanium trichloride and zinc dialkyl. The ratios of components, yields and pertinent characteristics of the products are shown in Table 1.

Technical grade zinc diethyl is prepared by reacting a mixture of ethyl bromide and ethyl iodide with a zinc-copper couple, heating the resulting ethyl zinc halide and distilling off zinc diethyl. The zinc diethyl is redistilled and is then of the grade available as technical zinc diethyl. The technical grade contains about 0.002 milliequivalent of halogen per gram of solution.

The runs reported in Table 1 were carried out by placing into an agitated autoclave 50 ml. of a hydrocarbon solvent and the amounts of titanium trichloride and zinc diethyl shown in Table 1. The autoclave was maintained under an inert atmosphere at all times until propylene addition was commenced. The autoclave was brought to a reaction temperature of 70° C. and propylene was then added to provide a reaction pressure in the range between 120 and 160 p.s.i.

At the termination of the polymerization the temperature was lowered to about room temperature and solid polypropylene recovered by filtering the resulting reaction mixture, washing the solid with a hydrocarbon solvent several times and then with methanol and drying the product in a heated vacuum oven. The hydrocarbon solvent washings were evaporated to recover the portion of the polymer which was soluble in the hydrocarbon.

In runs 1 and 4 of Table 1 the hydrocarbon solvent employed was benzene and in runs 2 and 3 it was heptane.

In run number 1 technical grade zinc diethyl was used and it is seen that this resulted in an induction period in excess of 10 hours and in the production of only a small yield of polymer during the following 22 hour reaction period. The polymer had a very low intrinsic viscosity and a relatively large spread in crystallinity between the whole and the washed polymer, indicating the production of a large proportion of relatively low molecular weight polymer.

In run number 2 the zinc diethyl was purified by distilling it through a spinning band column. Some improvement was obtained, as indicated by a somewhat shorter induction period which, however, was still in excess of 6 hours. The yield was somewhat higher and the polymer had a somewhat more uniform composition.

In run number 3 zinc diethyl was purified by heating over molten sodium. The induction period was reduced to 1 hour in this run and the yield and product characteristics were substantially improved.

In run number 4 zinc diethyl was purified by heating it over barium at 70° C. In this run the ratio of zinc to titanium was substantially lower than in runs 1–3, which would have some effect on the result. It is found that the induction period was reduced to 2 hours by the purification from more than the 10 hours in run number 1. The yield was very high and the product had desirably high crystallinity and a somewhat higher intrinsic viscosity than the product in the other runs.

EXAMPLE 2

When zinc dipropyl is employed under conditions similar to those of Examples 1 and 3, respectively, a similar improvement in reduction of induction period is observed and the crystallinity of the polymer produced with purified zinc dialkyl is substantially higher, exceeding the best results obtained with zinc diethyl. The yield and intrinsic viscosity of polymer obtained with the untreated zinc dipropyl are higher than obtained with corresponding zinc diethyl.

*Table 1*

| Run No. | $ZnR_2$ | $ZnR_2$ mmole | $TiCl_3$ mmole | Zn/Ti | Induct. Hours | Polymer Yield, g. | | Percent Insoluble | | Dl./g. |
|---|---|---|---|---|---|---|---|---|---|---|
| | | | | | | Whole | Washed | Whole | Washed | |
| 1 | $ZnEt_2$ | 5.9 | 1.18 | 5.0 | >10 | 8.8 | 6.9 | 64 | 81.0 | 0.86 |
| 2 | $ZnEt_2$ | 4.5 | 0.90 | 5.0 | >6 | 13.5 | 11.6 | 70 | 79.0 | 1.2 |
| 3 | $ZnEt_2$ | 5.5 | 1.03 | 5.6 | 1 | 19.3 | 17.1 | 73 | 82.0 | 1.4 |
| 4 | $ZnEt_2$ | 5.0 | 1.30 | <3.8 | 2 | 34.5 | 30.2 | 76 | 86.0 | 3.8 |

EXAMPLE 3

When technical grade zinc diethyl is purified with 5 mol percent molten sodium and used with $TiCl_3$ at a mol ratio of 2 mols of zinc per mol of titanium the induction period is again reduced to 1 hour and the crystallinity of the resulting is substntially improved, being about 90% insoluble for unwashed polymer.

We claim as our invention:

1. A method for preparing zinc dialkyl suitable for use in olefin polymerization catalysts which comprises reacting an alkyl halide with a zinc copper alloy, heating the resulting zinc alkyl halide to distill off zinc dialkyl, contacting distilled zinc dialkyl with an effective amount of a reducing metal selected from the group consisting of barium and sodium, and separating purified zinc dialkyl from the residue which contains said reducing metal.

2. A method for preparing zinc dialkyl suitable for use in olefin polymerization catalysts which comprises reacting an alkyl halide with zinc-copper alloy, recovering the resulting zinc dialkyl, contacting said zinc dialkyl with about 5 mole percent of molten sodium, and separating purified zinc dialkyl from the sodium-containing residue.

3. A method for preparing zinc diethyl suitable for use in olefin polymerization catalysts which comprises reacting an ethyl halide with a zinc-copper alloy, heating the resulting zinc ethyl halide to distill off zinc diethyl, contacting said distilled zinc diethyl with about 5 mole percent, based on said zinc diethyl, of molten sodium, and separating purified zinc dialkyl from the sodium-containing residue by distillation.

References Cited in the file of this patent

UNITED STATES PATENTS

| | | |
|---|---|---|
| 2,473,434 | Lindsey | June 14, 1949 |
| 2,886,561 | Reynolds et al. | May 12, 1959 |
| 2,899,414 | Mertes | Aug. 11, 1959 |
| 2,904,542 | Fasce et al. | Sept. 15, 1959 |
| 2,910,461 | Nowlin et al. | Oct. 27, 1959 |
| 2,969,381 | Blitzer et al. | Jan. 24, 1961 |

FOREIGN PATENTS

| | | |
|---|---|---|
| 558,252 | Belgium | Dec. 9, 1957 |
| 534,888 | Belgium | Jan. 31, 1955 |
| 821,107 | Great Britain | Sept. 30, 1959 |

OTHER REFERENCES

The Chemistry of Organometallic Compounds, Rochow et al. (1957), John Wiley & Sons, New York, N.Y., p. 104.